United States Patent Office 2,947,720
Patented Aug. 2, 1960

2,947,720

OXIDATION PRODUCTS OF 6-SUBSTITUTED-2,2,4-TRIALKYL DIHYDROQUINOLINES AS ANTIOXIDANTS

Frederick J. Webb, Cuyahoga Falls, Ohio, assignor to The Firestone Tire & Rubber Company, Akron, Ohio, a corporation of Ohio No Drawing. Original application July 29, 1955, Ser. No. 525,361. Divided and this application Feb. 20, 1958, Ser. No. 716,286

10 Claims. (Cl. 260—45.8)

This invention relates to the use of the oxidation products of 6-substituted-2,2,4-trialkyl dihydroquinolines as antioxidants in rubber. This application is a division of my application Serial No. 525,361, filed July 29, 1955, now U.S. Patent No. 2,849,452.

The 6-substituted-2,2,4-trialkyl - 1,2 - dihydroquinolines are commercially available. The three alkyl substituents are methyl or ethyl or a mixture of the two. The 6-substituents are alkyl, aryl, alkoxy, or aryloxy. The alkyl of such substituents may include 1 to 18 carbon atoms and the aryl may be phenyl or phenyl substituted with one or more alkyl substituents of 1 to 12 carbon atoms.

On oxidation, the two nitrogen groups are united. The oxidation compound is a hydrazine-type material of the following formula:

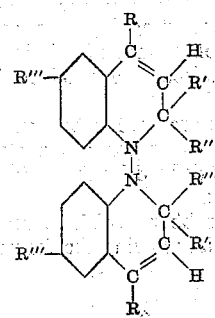

in which R, R' and R'' are alkyl substituents of the class consisting of methyl and ethyl and R''' is from the group consisting of alkyl, aryl, alkoxy, and aryloxy, as described.

The compounds are made by oxidation of the corresponding dihydroquinolines. The dihydroquinolines in which all three alkyl substituents are methyl, and those in which one attached to the 2-carbon is methyl and the second and third attached to the 4-carbon is ethyl, are commercial, as in 2,2,4-trimethyl-6-ethoxy-1,2-dihydroquinoline and 2,2,4-trimethyl-6-phenyl-1,2-dihydroquinoline, etc. When two different dihydroquinolines are oxidized simultaneously, the substituents in the different nuclei of the reaction product will be different.

The following examples represent the oxidation of the quinoline compounds:

EXAMPLE I

A solution of 25 g. of 2,2,4-trimethyl-6-phenyl-1,2-dihydroquinoline in 400 ml. of permanganate-stable acetone was treated with 11.5 g. of potassium permanganate during a 3.5 hour period at 3° C. The mixture was filtered and the acetone allowed to evaporate at room temperature. The solid residue weighed 14.2 g. A five-gram portion was extracted ten times with ethyl alcohol at −50° C. and three times with petroleum ether and then air dried to give 3 g. of a white crystalline solid melting at 121–122° C.

*Analysis.*—Calcd. for $C_{36}H_{36}N_2$: C, 87.07; H, 7.31; molecular weight, 497. Found: C, 86.75, 86.55; H, 7.25, 7.30; molecular weight, 522.

EXAMPLE II

A solution of 20.3 g. (0.1 mole) of freshly distilled 2,2,4-trimethyl-6-ethoxy-1,2-dihydroquinoline in 400 ml. of permanganate-stable acetone, was cooled to 3° C. and treated gradually while stirring with 9.5 g. (0.06 mole) of potassium permanganate. Decolorization of the permanganate was very rapid. Later 3 g. potassium permanganate were added in one-gram lots. This also decolorized rapidly. The mixture was filtered and the acetone evaporated at room temperature. The residue was a dark brown, viscous oil. Attempts were made to crystallize this material by dissolving it in petroleum ether and cooling in Dry-ice alcohol. A gummy brown material separated. The supernatant liquid was poured off.

From this solution, on standing and partial evaporation, a crystalline solid separated; weight 5.0 g. After one washing with alcohol and one recrystallization from benzene and alcohol, the material melted at 109–110° C.

*Analysis.*—Calcd. for $C_{28}H_{36}O_2N_2$: C, 77.73; H, 8.39; molecular weight 432.6. Found: C, 78.01, 78.10; H, 8.20, 8.11; molecular weight 425, 422.

Instead of the foregoing starting materials, other 2,2,4-trialkyl-6-substituted-1,2-dihydroquinolines which may be used to produce the corresponding oxidation products which, in turn, are suitable for use as rubber antioxidants follow:

2,2,4-trimethyl-6-methoxy-1,2-dihydroquinoline
2,2,4-trimethyl-6-butoxy-1,2-dihydroquinoline
2,2,4-triethyl-6-octoxy-1,2-dihydroquinoline
2,2-dimethyl-4-ethyl-6-undecoxy-1,2-dihydroquinoline
2,2-dimethyl-4-ethyl-6-propyl-1,2-dihydroquinoline
2,2,4-trimethyl-6-heptyl-1,2-dihydroquinoline
2,2,4-triethyl-6-undecyl-1,2-dihydroquinoline
2,2,4-trimethyl-6-tolyl-1,2-dihydroquinoline
2,2,4-trimethyl-6-xylyl-1,2-dihydroquinoline
2,2,4-trimethyl-6-octyl-1,2-dihydroquinoline
2,2,4-trimethyl-6-octadecyl-1,2-dihydroquinoline
2-methyl-2,4-diethyl-6-methyl-1,2-dihydroquinoline
2-methyl-2,4-diethyl-6-phenyl-1,2-dihydroquinoline
2,2,4-trimethyl-6-dihexylphenyl-1,2-dihydroquinoline
2,2,4-trimethyl-6-tributylphenyl-1,2-dihydroquinoline
2,2-trimethyl-4-ethyl-6-phenoxy-1,2-dihydroquinoline
2,2,4-trimethyl-6-dimethylphenoxy-1,2-dihydroquinoline
2,2,4-trimethyl-6-diisopropylphenoxy-1,2-dihydroquinoline
2,2,4-trimethyl-6-isopropylphenyl-1,2-dihydroquinoline
2,2-dimethyl-4-ethyl-6-diisopropylphenoxy - 1,2 - dihydroquinoline
2,2-dimethyl-4-ethyl-6-isopropylphenyl-1,2 - dihydroquinoline
2,2,4-trimethyl-6-dodecyl-1,2-dihydroquinoline
2,2,4-trimethyl-6-butyl-1,2-dihydroquinoline
2-methyl-2,4-diethyl-6-dodecyl-1,2-dihydroquinoline
2-methyl-2,4-diethyl-6-ethoxy-1,2-dihydroquinoline The rubber compositions in which the stabilizers may be used in small amounts include those used in tires, inner tubes, rubber threads, foamed rubber products, and other products from natural rubber or a sulfur-vulcanizable synthetic rubber homopolymer of a conjugated diene such as butadiene (e.g., polybutadiene-BR) or an alkyl derivative thereof (e.g., polyisoprene-IR), or rubber copolymer of a conjugated diene with an ethylenically unsaturated comonomer (e.g., SBR, NBR, IIR, SIR, PBR) or a mixture of any of these rubbers or any similarly vulcanizable rubber composition.

By sulfur vulcanization is meant the curing of rubber by reaction with either free sulfur or a vulcanizing agent of the sulfur-donor type. Known agents of the latter type include the various phenol polysulfides, including the alkyl derivatives thereof, the xanthogen polysulfides, the thiuram disulfides and polysulfides, various amine sulfides, including dialkylamine polysulfides and reaction products of primary amines with excess sulfur. Known vulcanization accelerators are useful in speeding up the vulcanization process and are operative herein, especially the relatively active accelerators, including the thiazole sulfenamides, e.g., cyclohexyl benzothiazole sulfenamide, thiazoline sulfenamides, thiocarbamyl sulfenamides, mercaptothiazoles, mercaptothiazolines, thiazolyl mono- and disulfides, the dithiocarbamates, the thiuram sulfides, xanthogen sulfides, metallic salts of mercaptothiazoles, mercaptothiazolines and dithiocarbamic acids. One or more accelerator activator is often used with any of the accelerators mentioned, and such activators include the various derivatives of guanidine known in the art, amine salts or organic and inorganic acids, various amines themselves, alkaline salts such as sodium acetate and the like, as well as other activators known to the art.

Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butyl xanthate, zinc ethyl xanthate, zinc salt of mercaptobenzolthiazole, zinc dimethyl dithiocarbamate, zinc dibutyl dithiocarbamate. Although vulcanization is usually accomplished by heating a vulcanizable rubber composition at a temperature in the range of 240 to 400 F. for a time ranging from several hours to a few seconds, vulcanization does take place at lower temperatures, such as ordinary room temperature. It is quite common to vulcanize a latex film containing an ultra-accelerator by allowing the film to remain at room temperature for several hours or a few days.

The antioxidants of Examples I and II were compounded with rubber according to the following formula for a tread stock:

| | |
|---|---|
| Natural rubber | 100 |
| Oil softener | 4 |
| Stearic acid | 3 |
| Zinc oxide | 3 |
| Accelerator | 1 |
| Sulfur | 3 |
| Carbon black | 50 |
| Antioxidant | 1 |
| | 165 |

The various samples were cured 40 minutes at 280° F. The test properties of the cured samples are recorded in the following table, and these properties are compared with a blank similarly compounded but including no antioxidant. In the tables, modulus, tensile strength, and elongation are recorded in pounds per square inch. Oxygen absorption by the various samples was determined as described in the article by J.R. Shelton and Hugh Winn in Industrial and Engineering Chemistry, volume 38, page 71 (1948). By plotting the milliliters of oxygen absorbed per gram of rubber polymer, against the hours required for the absorption, and determining the slope of the straight-line portion of each curve which refers to the constant rate of oxygen absorption, the rates of absorption were obtained and are given in the tables.

Table 1

| Formulation: | | |
|---|---|---|
| Masterbatch | 164 | 164 |
| Blank | | |
| Example I | | 1 |
| Normal Properties: | | |
| Modulus (300%) | 1,900 | 1,800 |
| Modulus (400%) | 2,825 | 2,800 |
| Tensile | 3,990 | 3,975 |
| Elongation | 500 | 490 |
| Properties After Aging 2 Days (Air Oven) at 212° F.: | | |
| Modulus (300%) | 2,025 | 2,125 |
| Tensile | 2,025 | 2,425 |
| Tensile retained, percent | 55 | 61 |
| Elongation | 315 | 340 |
| Oxygen Absorption, 90° C.: | | |
| Hours for absorption, 10 ml./g. rubber | 19.5 | 30 |
| Total hours in absorption apparatus | 32 | 55 |
| Total oxygen absorbed, ml./g. rubber | 15.8 | 20.2 |
| Rate of oxygen absorption ml./hr./g | 0.380 | 0.252 |
| Properties After Oxygen Absorption: | | |
| Modulus (300%) | | |
| Tensile | 575 | 1,050 |
| Elongation | 180 | 250 |

A sample was prepared according to the same tread stock formula with one part of the oxidation product of Example II, and compared with a typical blank. The results are recorded below:

Table 2

| Formulation: | | |
|---|---|---|
| Masterbatch | 164 | 164 |
| Blank (typical) | | |
| Example 2 | | 1 |
| Normal Properties: | | |
| Modulus 300% | 1,900 | 2,025 |
| Modulus 400% | 2,825 | 3,200 |
| Tensile | 3,990 | 3,775 |
| Elongation | 500 | 465 |
| Oxygen Absorption 90° C.: | | |
| Hrs. for absorption, 10 ml./g. rubber | 19.5 | 27 |
| Hrs. for absorption, 20 ml./g. rubber | | 44 |
| Total hrs. in absorption apparatus | 32 | 45 |
| Total oxygen absorbed/g. rubber | 15.8 | 22.6 |
| Rate of oxygen absorption, ml./hr./g | 0.380 | 0.246 |
| Properties After Oxygen Absorption: | | |
| Tensile | 575 | 1,225 |
| Elongation | 180 | 240 |

The results of the foregoing tests, as reported in both tables, show the compounds of this invention have a decided stabilizing effect, and produce improved vulcanizates.

The antioxidants are used in any small amount, as for example 0.1 to 10 parts per 100 parts of rubber.

The invention is defined by the claims which follow.

What I claim is:

1. Vulcanized rubber which contains a stabilizing amount of a stabilizer having the formula

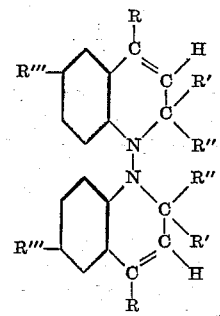

in which R, R' and R'' are alkyl substituents of the class consisting of methyl and ethyl and R''' is from the group consisting of alkyl, aryl, alkoxy and aryloxy; the alkyl groups of the foregoing alkyl and alkoxy substituents each containing 1 to 18 carbon atoms, and the aryl groups of the foregoing substituents being from the class consisting of phenyl and phenyl substituted with at least one substituent of 1 to 12 carbon atoms; the rubber being of the class consisting of sulfur-vulcanizable natural and synthetic rubbers which are from the class consisting of homopolymers of conjugated dienes and copolymers of conjugated dienes and an ethylenically unsaturated comonomer.

2. Vulcanized rubber of claim 1 which contains a stabilizing amount of a compound of the given formula in which R, R' and R" alkyl groups are methyl.

3. Vulcanized rubber of claim 1 which contains a stabilizing amount of the compound of the given formula in which R, R' and R" alkyl groups are methyl and the two R'" groups are phenyl.

4. Vulcanized rubber of claim 1 which contains a stabilizing amount of the compound of the given formula in which R, R' and R" alkyl groups are methyl and the two R'" groups are ethoxy.

5. Vulcanized rubber of claim 1 which contains a stabilizing amount of a compound of the given formula in which R, R' and R" alkyl groups are methyl and the two R'" groups are alkyl groups each containing 1 to 18, inclusive, carbon atoms.

6. The process of vulcanizing rubber which comprises sulfur-vulcanizing the rubber in the presence of a stabilizing amount of a compound having the formula

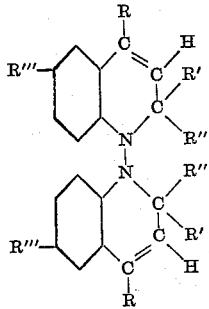

in which R, R' and R" are alkyl substituents of the class consisting of methyl and ethyl and R'" is from the group consisting of alkyl, aryl, alkoxy and aryloxy; the alkyl groups of the foregoing alkyl and alkoxy substituents each containing 1 to 18 carbon atoms, and the aryl groups of the foregoing substituents being from the class consisting of phenyl and phenyl substituted with at least one substituent of 1 to 12 carbon atoms; the rubber being from the class consisting of sulfur-vulcanizable natural and synthetic rubbers which are from the class consisting of homopolymers of conjugated dienes and copolymers of a conjugated diene and an ethylenically unsaturated comonomer.

7. The process of vulcanizing rubber according to claim 6 which comprises sulfur-vulcanizing the rubber admixed with a stabilizing amount of a compound of the given formula in which the R, R' and R" groups are methyl.

8. The process of vulcanizing rubber according to claim 6 which comprises sulfur-vulcanizing the rubber admixed with a stabilizing amount of the compound of the given formula in which R, R' and R" alkyl groups are methyl and both R'" groups are phenyl.

9. The process of vulcanizing rubber according to claim 6 which comprises sulfur-vulcanizing the rubber admixed with a stabilizing amount of the compound of the given formula in which R, R' and R" alkyl groups are methyl and both R'" groups are ethoxy.

10. The process of vulcanizing rubber according to claim 6 which comprises sulfur-vulcanizing the rubber admixed with a stabilizing amount of the compound of the given formula in which R, R' and R" alkyl groups are methyl and both R'" groups are alkyl groups each containing 1 to 18, inclusive, carbon atoms.

References Cited in the file of this patent

UNITED STATES PATENTS

| 2,500,229 | Arnold et al. | Mar. 14, 1950 |
| 2,713,047 | Beaver et al. | July 12, 1955 |

FOREIGN PATENTS

| 468,787 | Great Britain | July 12, 1937 |